(12) United States Patent
Tashiro et al.

(10) Patent No.: US 9,430,940 B2
(45) Date of Patent: Aug. 30, 2016

(54) REGULATION INFORMATION ANALYSIS SYSTEM

(71) Applicants: ZENRIN CO., LTD., Kitakyushu-shi, Fukuoka (JP); TOYOTA JIDOSHA KABUSHIKI KAISHA, Toyota-shi, Aichi (JP); AISIN AW CO., LTD., Anjo-shi, Aichi (JP)

(72) Inventors: Hiroyuki Tashiro, Kitayushu (JP); Kei Hiroo, Kitakyushu (JP); Yoshitaka Nishino, Kitakyushu (JP); Motohiro Nakamura, Toyota (JP); Kazunori Watanabe, Toyota (JP); Sadahiro Koshiba, Okazaki (JP); Kazuteru Maekawa, Okazaki (JP)

(73) Assignees: ZENRIN CO., LTD., Kitakyushu-Shi (JP); TOYOTA JIDOSHA KABUSHIKI KAISHA, Toyota-Shi (JP); AISIN AW CO., LTD., Anjo-Shi (JP)

( * ) Notice: Subject to any disclaimer, the term of this patent is extended or adjusted under 35 U.S.C. 154(b) by 276 days.

(21) Appl. No.: 13/944,765

(22) Filed: Jul. 17, 2013

(65) Prior Publication Data

US 2013/0345954 A1  Dec. 26, 2013

Related U.S. Application Data

(63) Continuation of application No. PCT/JP2012/050879, filed on Jan. 17, 2012.

(30) Foreign Application Priority Data

Jan. 19, 2011 (JP) .................................. 2011-009157

(51) Int. Cl.
  *G08G 1/095* (2006.01)
  *G08G 1/00* (2006.01)
  (Continued)

(52) U.S. Cl.
  CPC ............. *G08G 1/00* (2013.01); *G01C 21/3492* (2013.01); *G08G 1/0112* (2013.01); *G08G 1/0129* (2013.01)

(58) Field of Classification Search
  CPC ...... G08G 1/0112; G08G 1/08; G08G 1/095; G08G 1/07; G01S 5/0027
  USPC ........ 701/117, 119; 340/922, 928, 917, 920, 340/932
  See application file for complete search history.

(56) References Cited

U.S. PATENT DOCUMENTS 3,333,240 A * 7/1967 Gerlough ................. G08G 1/08
  340/922
3,613,073 A * 10/1971 Clift ......................... G08G 1/08
  340/920
(Continued)

FOREIGN PATENT DOCUMENTS

EP  1154389  11/2001
JP  2005-267470  9/2005
(Continued)

OTHER PUBLICATIONS

Supplementary Search Report dated Feb. 4, 2014 from EP 12736382.8.

*Primary Examiner* — Yuri Kan
(74) *Attorney, Agent, or Firm* — Beyer Law Group LLP

(57) ABSTRACT

A regulation information analysis system determines transit regulations imposed on a target road or intersection to be analyzed based on probe information sent from a plurality of vehicles. An analysis terminal determines if transit regulations are in effect or not by detecting if the probe information indicating a transition that violates a method of transition to be analyzed, such as right/left turn prohibition is present at the target road or intersection. The analysis terminal determines, based on the geometric shape and the like of the target road or intersection, if there is an avoidance factor which a driver would desire to avoid transiting the target rode or intersection. The quantity of the probe information used for determining the presence or absence of the transit regulations is increased if the avoidance factor is found, whereby the determination accuracy is increased while the overall quantity of the probe information is suppressed.

20 Claims, 13 Drawing Sheets

(51) Int. Cl.
*G08G 1/01* (2006.01)
*G01C 21/34* (2006.01)

(56) References Cited

U.S. PATENT DOCUMENTS 3,883,842 A * 5/1975 Marmo .................... G08G 1/07
340/932
2008/0270015 A1 * 10/2008 Ishikawa ............... G01S 5/0027
701/119
2009/0231160 A1 * 9/2009 Ramasubbu ........... G08G 1/095
340/917
2011/0205086 A1 * 8/2011 Lamprecht ............... G08G 1/08
340/928

FOREIGN PATENT DOCUMENTS

| JP | 2005-267471 | 9/2005 |
| JP | 2005-284588 | 10/2005 |
| JP | 2008-76366 | 4/2008 |
| JP | WO 2010/109805 | 9/2010 |

* cited by examiner

DETECTING CONDITIONS: A1=0, A2≧N

DETECTING CONDITIONS: B1=0, B1+B4+B5>0, B1+B2+B3≧N

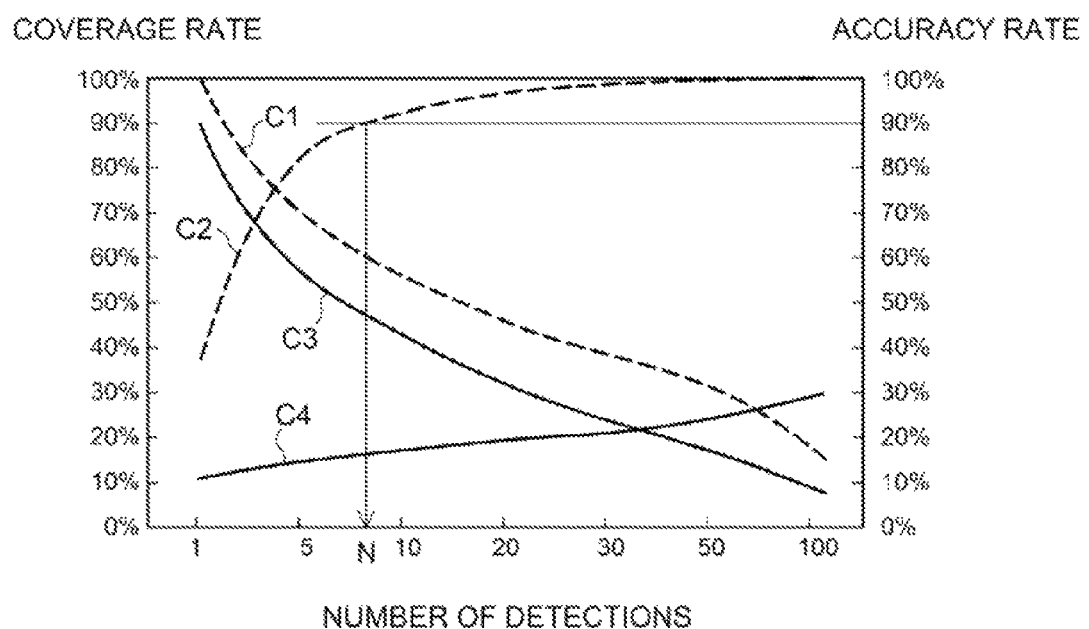

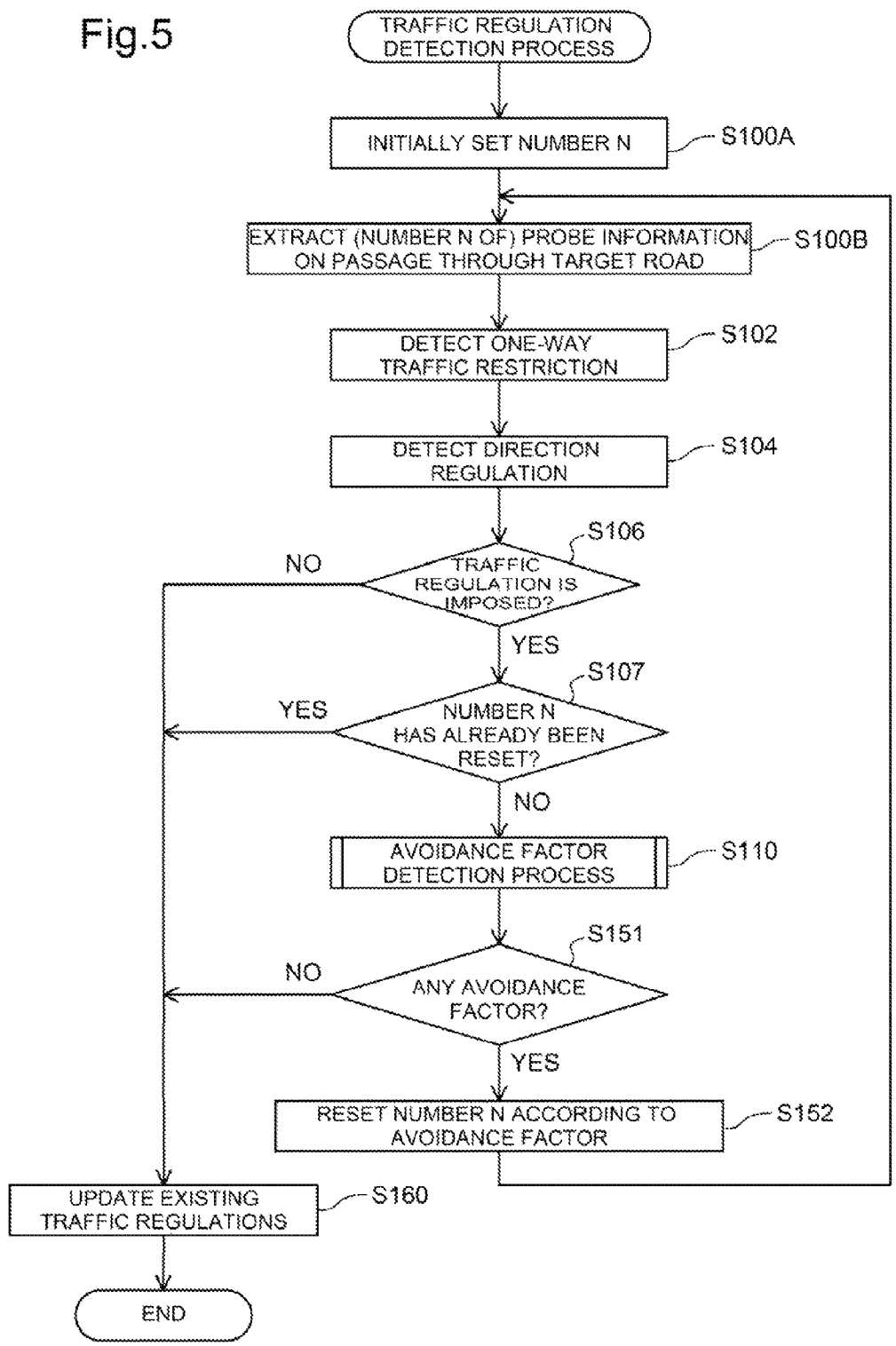

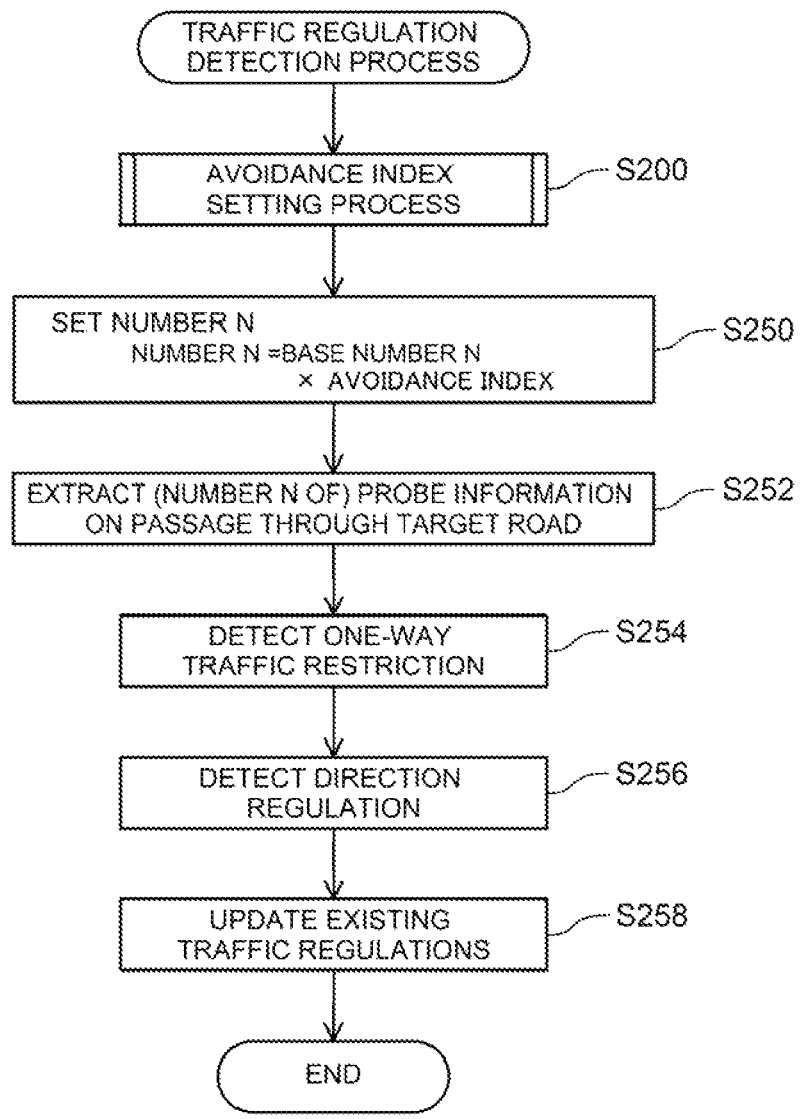

REGULATION INFORMATION ANALYSIS SYSTEM

CLAIM OF PRIORITY

The present application is a Continuation of International Application No. PCT/JP2012/050879 filed on Jan. 17, 2012, which claims benefit of Japanese Patent Application No. 2011-009157 filed Jan. 19, 2011. The entire contents of each application noted above are hereby incorporated by reference.

BACKGROUND OF THE INVENTION

1. Field of the Invention

The present invention relates to technology of analyzing the presence or the absence of a traffic regulation on a road, based on probe information regarding the traveling path of probe cars.

2. Description of the Related Art

Probe information regarding the traveling path of probe cars is effectively used for upgrading of map data. The probe car is a vehicle that momentarily detects its own location by, for example, GPS (Global Positioning System) and sends the detection record via a network. The technique of detecting the presence or the absence of any traffic regulation using the information of the probe cars is disclosed, for example, in Japanese Patent No. JP 4116582B. This technique extracts probe information on a target road as a detection target and tracks back each of the probe information in time series to keep statistics on from which road each probe car enters the target road. When there is no flow of traffic from a specific road to the target road, it is determined that a traffic regulation is imposed on the route going from the specific road to the target road.

BRIEF DESCRIPTION OF THE INVENTION

The method of detecting the presence or the absence of a traffic regulation using the probe information is the statistical approach, so that the absence of probe information on a specific route does not necessarily indicate the presence of a traffic regulation. There is a possibility that the specific route is not selected according to the destination of each probe car. A sufficient number of probe information is required to be used for detection, in order to avoid misdetection by such reason and improve the detection accuracy of the traffic regulation. There are, however, numerous combinations of intersections, roads and traffic regulations as the detection objects, and it is practically impossible to provide the probe information that allows detection with sufficient accuracy with respect to all the combinations.

In order to solve the foregoing problem, the object of the invention is to improve the detection accuracy of the traffic regulation, while reducing the total number of probe information required for detection.

According to one aspect of the invention, there is provided a regulation information analysis system that analyzes a specification of a traffic regulation imposed on a target road or a target intersection as an analysis target, based on probe information regarding a traveling path. In the description herein, the term of traffic regulation is used as the collective term of a traffic restriction imposed on an intersection, such as no-left turn or no-right turn (hereinafter referred to as "direction regulation") and a traffic regulation imposed on a road, i.e., one-way traffic.

The regulation information analysis system of the invention includes a probe information storing unit, a road network data storing unit, a traffic regulation determination unit and an avoidance factor determination unit.

The probe information storing unit stores probe information with respect to a plurality of vehicles. The probe information of each vehicle may not necessarily regard the traveling path stored continuously but may regard the traveling path stored discretely.

The road network data storing unit stores road network data that expresses intersections and roads as nodes and links. The road network data storing unit may additionally store attribute of each intersection or road, such as the type and the width, and existing traffic regulation information.

The traffic regulation determination unit reads a predetermined reference number or a greater number of probe information on passage of the target intersection or the target road from the probe information storing unit. The traffic regulation determination unit then detects the presence or the absence of a traffic regulation set as an analysis object, based on a number or a ratio of probe information on passage by a target route in accordance with the traffic regulation. For example, when the number or the ratio of the probe information on passage by the target route is less than a predetermined value, the traffic regulation determination unit may detect the presence of a traffic regulation. This predetermined value may be set equal to 0 on the premise that there is no probe car running against the traffic regulation. When the number or the ratio of the probe information on passage by the target route exceeds the predetermined value, on the contrary, the traffic regulation determination unit may detect the absence of a traffic regulation.

The avoidance factor determination unit detects the status of an avoidance factor, i.e., the presence or the absence of the avoidance factor or an index expressed by a numerical value indicating the avoidance factor, with respect to the target intersection or the target road. The avoidance factor means the reason why the user keeps from passing through the target intersection or the target road by the target route. The avoidance factor during passage by the target route may be, for example, the narrower width of the road to enter than the current road, the acute-angled connection of roads at an intersection, the detour route known to the user or the access to a closed district away from the major road. In general, any of various causes that are expected to decrease the number of users passing by the target route is the avoidance factor. The condition for detecting the status of the avoidance factor is specified using the node representing the target intersection or the link representing the target road according to the specification of the avoidance factor. The condition may be specified to include other nodes and links. The avoidance factor determination unit reads the road network data in a specific area including the target intersection or the target road from the road network data storing unit and detects the status of the avoidance factor by application of the specified condition.

The traffic regulation determination unit of the invention changes a method of detecting the presence or the absence of the traffic regulation according to a result of detection of the avoidance factor. The process may first detect a traffic regulation, subsequently detect an avoidance factor, and detect the traffic regulation again based on the detection result of the avoidance factor. Alternatively the process may first detect an avoidance factor and subsequently detect the presence or the absence of a traffic regulation by the detection method according to the detection result of the avoidance factor. The detection method may be changed by changing the reference number of probe information used for the detection, by changing a condition that the number or the ratio of probe information in accordance with the target route is to be satisfied to determine the presence of a traffic regulation, or by changing whether the result of detection on the presence or the absence of a traffic regulation is to be employed.

When the target route has an avoidance factor, there are originally a small number of probe cars taking the target route. There is accordingly a high possibility that the absence of probe information on the target route does not necessarily indicate the presence of a traffic regulation. The target route with an avoidance factor accordingly requires more careful detection of the presence or the absence of a traffic regulation and increases the number of probe information required for accurate detection, compared with the target route without any avoidance factor. This means an extremely large number of probe information is required to enhance the accuracy when the same detection method is employed for all the target intersections, the target roads and the target routes. The regulation information analysis system of the invention, on the other hand, detects the status of the avoidance factor and changes the method of detecting the traffic regulation according to the detection result of the avoidance factor. As a result, the detection method that ensures the sufficient accuracy of detection of the traffic regulation may be selectively used according to the avoidance factor. This improves the detection accuracy, while reducing the total number of probe information required for detection.

Any of various embodiments may be adopted for the detection method by taking into account the avoidance factor. According to one embodiment, the traffic regulation determination unit may determine adequacy of the reference number, based on the result of detection of the avoidance factor, so as to determine validity or invalidity of the detection of the presence or the absence of the traffic regulation. The adequacy of the reference number may be determined, for example, by storing the relationship of the reference number of probe information required to ensure a specified accuracy of detection on the presence or the absence of a traffic regulation to the avoidance factor and determining whether the number of probe information used for detection of the traffic regulation satisfies the stored relationship.

Determining the validity or invalidity of the detection result of the traffic regulation prevents the invalid detection result, i.e., the detection result of the insufficient accuracy, from being used and thereby improves the overall accuracy of the detection result.

According to another embodiment, the traffic regulation determination unit may detect the presence or the absence of the traffic regulation with varying the reference number based on the result of detection of the avoidance factor. For example, in the presence of an avoidance factor, the reference number may be increased. This ensures detection of the traffic regulation with high accuracy even for the target route having the higher degree of the avoidance factor.

The detection result of the traffic regulation may be used according to any of various embodiments. For example, the detection result may be output as a target place of field survey. In another example, traffic regulation information may be stored in the road network data, based on the detection result.

When the traffic regulation information on the traffic regulation has already been stored in the road network data, the stored traffic regulation information may be updated based on the detection result of the traffic regulation. This efficiently corrects the wrong traffic regulation information.

A first embodiment of detecting the avoidance factor may detect the status of the avoidance factor, based on attribute of the target intersection or the target road or a geometric configuration of the target route. The attribute used for detection may be, for example, the type or the width of the target road. The geometric configuration used for detection may be, for example, whether the angle of right turn or the angle of left turn on the passage of the target intersection or the target road is an acute angle.

The first embodiment has the advantage of enabling relatively easy detection of the avoidance factor, based on the target intersection or the target road itself or the road connecting with the target intersection or the target road.

A second embodiment may use route search between two points specified using the road network data. This embodiment may set a specific area including the target intersection or the target road, specify two points as a start point and a terminal point of route search out of the specific area, and perform route search between multiple combinations of such two points to find a plurality of routes. The width of the specific area may be set arbitrarily. This embodiment detects the status of the avoidance factor, based on the number or the ratio of routes passing through the target intersection or the target road among or to the plurality of routes.

When the result of route search indicates a small number of or a low ratio of routes passing through the target intersection or the target road, there may be the reason of the low section rate of the route passing through the target intersection or the target road, for example, a detour route or approach to a closed district. The route passing through the target intersection or the target road is accordingly expected to have the avoidance factor. The second embodiment can detect the avoidance factor based on the road conditions in the wider area, which is not detectable by the first embodiment.

The detection of the avoidance factor may not be performed unconditionally but may be performed in a limited way under a certain condition. For example, in the configuration of detecting the presence of the traffic regulation on condition that the number or the ratio of probe information on passage by the target route is equal to or less than a predetermined value, the status of the avoidance factor may be detected only in the case of detection of the presence of the traffic regulation. When the result of detection of the traffic regulation without considering the avoidance factor indicates the absence of the traffic regulation based on the number or the ratio of the probe information exceeding the predetermined value, it is obvious that using a larger number of probe information after detection of the avoidance factor still gives the same detection result of the absence of the traffic regulation.

Detecting the avoidance factor only in the case of detection of the presence of the traffic regulation as described above prevents unnecessary detection of the avoidance factor and thereby reduces the processing load.

The invention may also be implemented by a regulation information analysis method performed by the computer to analyze traffic regulation information, as well as a computer program executed by the computer to enable such analysis. The invention may further be implemented by a computer readable storage medium, in which such a computer program is stored. The storage medium may be a flexible disk, a CD-ROM, a magneto-optical disk, an IC card, a ROM cartridge, a punched card, a printed matter with a barcode or another code printed thereon, any of internal storage devices (memories such as RAM and ROM) and external storage devices of the computer, or any of various other computer readable media.

BRIEF DESCRIPTION OF DRAWINGS

FIGS. 3A through 3C are diagrams showing the concept of traffic regulation analysis.

FIG. 5 is a flowchart showing another traffic regulation detection process according to one modification.

FIG. 11 is a flowchart showing a traffic regulation detection process according to a second embodiment.

DESCRIPTION OF EMBODIMENTS OF THE INVENTION

Embodiment 1

A. System Configuration

Figure 1:
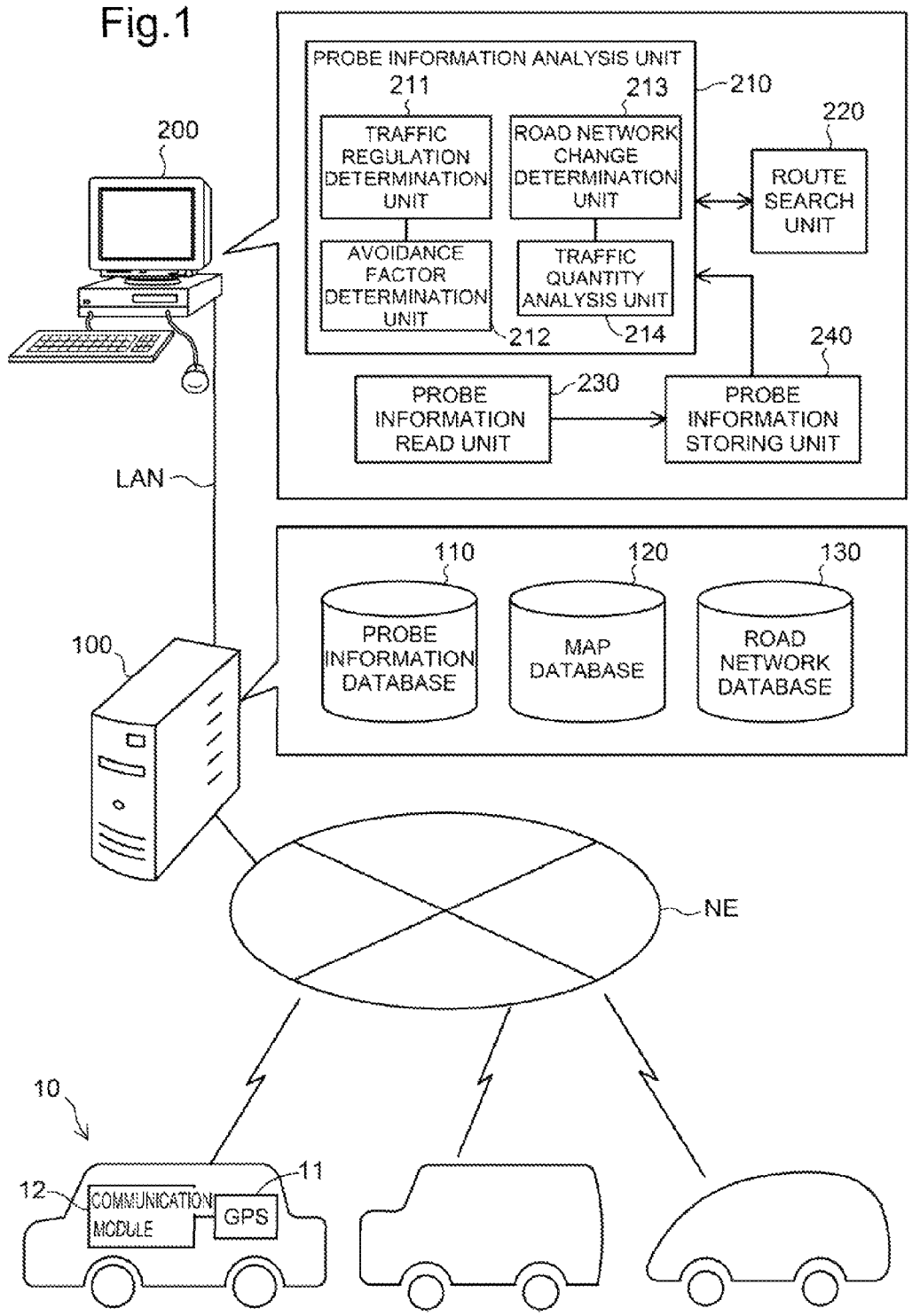
FIG. 1 is a diagram illustrating the configuration of a regulation information analysis system.

FIG. 1 is a diagram illustrating the configuration of a regulation information analysis system. The regulation information analysis system includes an analysis terminal 200 implemented by a personal computer (including a CPU, a RAM, a ROM and a hard disk drive) and a server 100 (including a CPU, a RAM, a ROM and a hard disk drive) with storage of databases. These constituents are interconnected by a network LAN. The analysis terminal 200 and the server 100 may be integrated with each other. Alternatively the functions of the analysis terminal 200 may be processed by a greater number of servers in a distributed manner.

The server 100 stores a probe information database 110, a map database 120 and a road network database 130.

The map database 120 stores polygon data used for drawing maps. The map database 120 is used to display the results of analysis on a map in the analysis terminal 200 or to display a map in a navigation system mounted on each probe car 10.

The road network database 130 stores road network data regarding a road network composed of roads and intersections respectively expressed in the form of links and nodes. The road network data may also be used for route search. The road network data is stored along with information regarding the road type such as national road or prefectural road, the road width such as the number of lanes, the regulation on driving direction such as no right turn and no left turn and the traffic regulation such as one-way traffic, with regard to the respective links and nodes.

The probe information database 110 is provided as a database that records the traveling path of each probe car 10 in time series. The configuration of the probe car 10 is also schematically illustrated.

Each probe car 10 is equipped with a GPS (Global Positioning System) 11 that allows position coordinate measurement. Any technique other than GPS may also be employed for position coordinate measurement. The probe car 10 is also equipped with a communication module 12 that sends (or uploads) location information measured by the GPS 11 at specified timings to the server 100 via the network NE. The server 100 stores the received location information with respect to each probe car 10 in the probe information database 110. The information uploaded by the probe car 10 may include the driving speed of the probe car 10 and information on the driving operations of an accelerator, a brake and a steering wheel, in addition to the location information.

The probe information may be uploaded from the probe car 10 to the server 100 at any of various timings. According to this embodiment, in order to collect information effective for analysis, the probe information is uploaded when the probe car 10 is driven at a specified or higher speed and is placed on any of the nodes and links stored in the road network database 130. Determination of whether the probe car 10 is placed on any of such links and nodes is readily achieved by mounting a navigation system, which uses road network data equivalent to the road network database 130, on the probe car 10.

The functions provided by the analysis terminal 200 are also illustrated as a block diagram. These functions are implemented by installation of computer programs for enabling the respective functions in the analysis terminal 200. Alternatively part or all of the functions may be implemented by the hardware configuration.

The following describes the functions of the analysis terminal 200. A probe information read unit 230 reads probe information required for analysis from the probe information database 110 of the server 100 and stores the read probe information into a probe information storing unit 240. The probe information database 110 stores the location information of each probe car 10 in the form of coordinates. According to this embodiment, the probe information read unit 230 performs a pre-analysis process to convert the location information into the form of nodes and links that is easier to use for analysis, and stores the converted location information into the probe information storing unit 240. The details of this pre-analysis process will be described later. In the following description, information processed by the pre-analysis process is called probe information, unless otherwise specified.

A route search unit 220 uses the road network data and performs route search between specified two points. The known Dijkstra's algorithm may be employed for route search. According to this embodiment, the results of route search are used for various analyses by a probe information analysis unit 210.

The probe information analysis unit 210 performs analysis based on the probe information stored in the probe information storing unit 240. The analysis terminal 200 of the embodiment is capable of analyzing the traffic regulations and determining a change in road network.

A traffic regulation determination unit 211 detects the traffic regulations on roads and intersections, based on the probe information. As described previously, traffic regulation information is stored along with the road network data. With respect to a certain road or intersection, however, there is a possibility that the traffic regulation information may be missing, the traffic regulation may newly be imposed, or different traffic regulation from previous regulation may be imposed. The traffic regulation determination unit 211 detects the traffic regulation information based on the probe information, so as to support upgrading of the traffic regulation information correlated to the road network data.

An avoidance factor determination unit 212 detects the presence or the absence and the degree of a factor that keeps the driver from passing through a certain road or intersection. This factor is hereinafter called avoidance factor. The avoidance factor during passage by a target route may be, for example, the narrower width of the road to enter than the current road, the acute-angled connection of roads at an intersection, the detour route known to the user or the access to a closed district away from the major road. The results of detection by the avoidance factor determination unit 212 are used for analysis by the traffic regulation determination unit 211.

A road network change determination unit 213 determines a change in road network to be reflected on the road network data, based on the daily changes of traffic on the respective roads and intersections obtained from the probe information.

A traffic quantity analysis unit 214 statistically calculates the daily traffic on the respective roads and intersections to be used for the above analysis, based on the probe information.

B. Pre-Analysis Process

Figure 2:
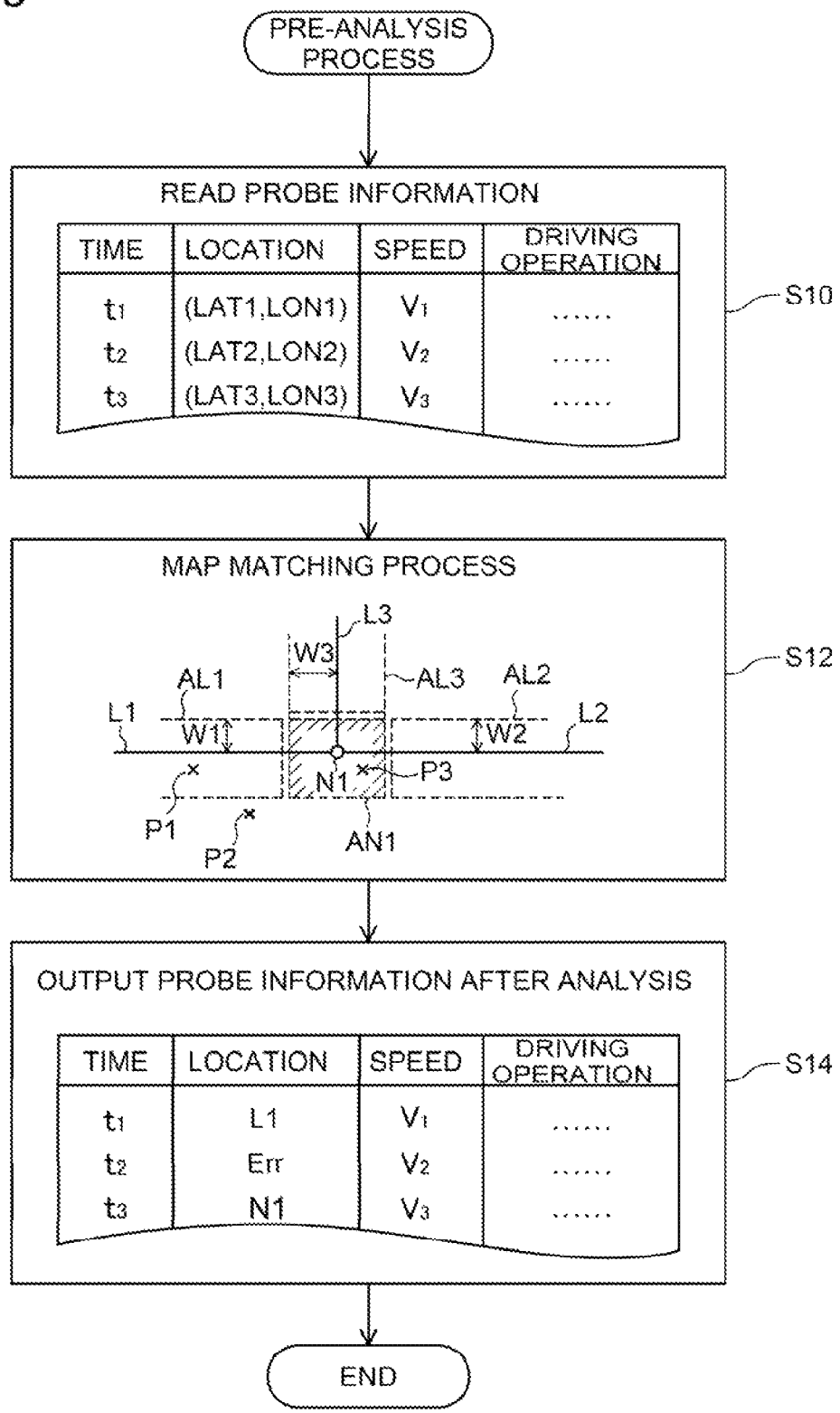
FIG. 2 is a flowchart showing a pre-analysis process of probe information.

The analysis terminal 200 performs the pre-analysis process of converting the location information from the coordinates to the form of nodes and links, when reading the probe information stored in the server 100. FIG. 2 is a flowchart showing the pre-analysis process of probe information. The pre-analysis process corresponds to the functions of the probe information read unit 230 and is executed by the CPU of the analysis terminal 200 as the hardware.

The CPU first reads probe information from the server 100 (step S10). An example of the structure of the probe information is illustrated. In this illustrated example, position coordinates are stored in the form of latitude and longitude coordinates, e.g., (LAT1,LON1) to (LAT3,LON3), in correlation to times t1 to t3. The CPU may additionally read the speeds V1 to V3 and the driving operations.

The CPU performs map matching process on the position coordinates (step S12). The concept of this process is also illustrated. An intersection consisting of links L1 to L3 and a node N1 is provided as an example. Areas AL1 to AL3 respectively having widths W1 to W3 are set for these links L1 to L3, based on the attribute on the road width, such as the number of lanes. The widths W1 to W3 may be set to larger values than the road widths by taking into account measurement error of location information by the GPS. An area AN1 specified by superimposing these areas AL1 to AL3 one on another is set for the node N1. In the illustration, the area AN1 is hatched for better discrimination.

The CPU identifies which of the areas AL1 to AL3 and AN1 includes each set of the position coordinates of the probe information and converts the position coordinates to a link or a node. Points P1 to P3 in the drawing represent the points corresponding to the position coordinates at the times t1 to t3. The point P1 is included in the area AL1, so that its position coordinates are converted to the link L1. The point P2 is out of the area AL1, so that its position coordinates are failed to be converted. The point P3 is included in the area AN1, so that its position coordinates are converted to the node N1.

The CPU outputs the probe information after the above analysis to the probe information storing unit 240 (step S14). The data structure after the analysis is also illustrated. As the result of the analysis, the location information is converted to the link or node: for example, the location information at the time t1 is converted to the link L1 and the location information at the time t3 is converted to the node N1. Since conversion of the position coordinates at the time t2 is failed, error representation (Err) is provided as the location information at the time t2.

C. Concept of Traffic Regulation Analysis

Figure 3A:
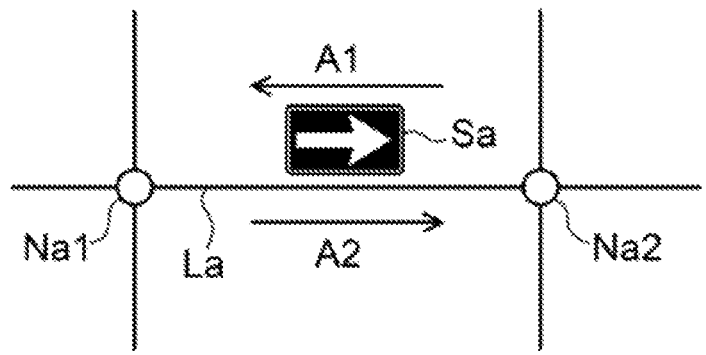
Figure 3B:
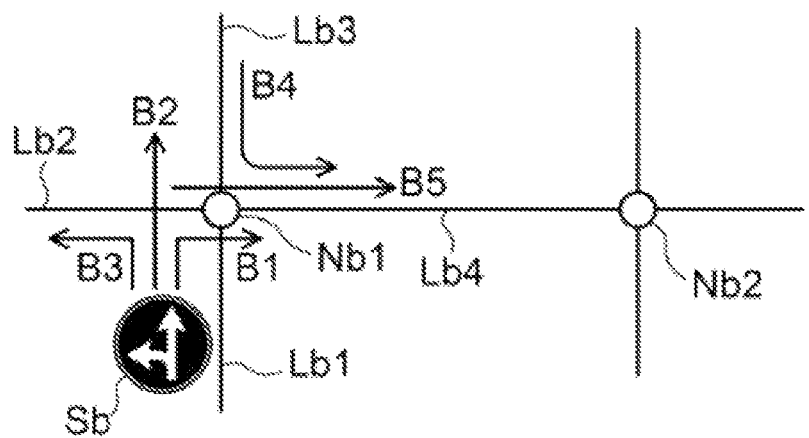

FIGS. 3A through 3C are diagrams showing the concept of traffic regulation analysis. The description first regards a method of detecting one-way traffic restriction with reference to FIG. 3A. As illustrated, it is assumed that one-way traffic restriction Sa in the direction of an arrow A2 is imposed on a link La between nodes Na1 and Na2. The object of this analysis is to statistically detect the presence or the absence of the one-way traffic restriction Sa, based on probe information. According to this embodiment, the presence of the one-way traffic restriction Sa in the direction of A2 is detected on satisfaction of both detection conditions 1 and 2 given below: (condition 1) A1=0 (probe information indicating zero probe car running in the direction of A1); and (condition 2) A2. N (probe information indicating N or a greater number of probe cars running in the direction of A2). N may be set arbitrarily. The meaning of such setting will be described later.

The condition 1 is set to zero probe car, on the premise that no probe car runs against the one-way traffic restriction. When the presence of any probe car that may violate the restriction is taken into account, the condition 1 may be provided as "A1. M" (M represents the number of probe cars that may run against the restriction). M may be set as the number of probe cars or may be set as the ratio (%) to the value N.

The description subsequently regards a method of detecting a direction regulation with reference to FIG. 3B. An intersection consists of nodes Nb1 and Nb2 and links Lb1 to Lb4. It is assumed that no-right turn restriction is imposed on the traffic flow from the link Lb1 to the node Nb1. The object of this analysis is to statistically detect the presence or the absence of the no-right turn restriction Sb, based on probe information.

According to this embodiment, the presence of the no-right turn restriction Sb is detected on satisfaction of all detection conditions 1 to 3 given below:

$B1=0;$ (condition 1)

$B1+B4+B5>0;$ and (condition 2)

$B1+B2+B3.N.$ (condition 3)

The condition 1 means that the probe information indicates zero probe car entering the node Nb1 from the link Lb1 and turning right as shown by an arrow B1. As in the case of the one-way traffic restriction, when the presence of any probe car that may violate the direction regulation is taken into account, the condition 1 may be provided as "B1. M" (M represents the number of probe cars that may run against the restriction).

The condition 2 means that the probe information indicates the presence of at least one probe car entering the link LB4 from the link Lb2 or the link Lb3 as shown by arrows B4 and B5. This condition excludes the case that the no-entry restriction (in other words, the one-way restriction in the reverse direction) is imposed on the link Lb4 in the direction from the node Nb1 to the node Nb2. The condition 3 means that the probe information indicates N or a greater number of probe cars as the total entering the node Nb1 from the link Lb1 as shown by arrows B1, B2 and B3. N may be set arbitrarily. The meaning of such setting will be described later.

FIG. 3B takes the no-right turn restriction as an example of the detection conditions. Similar detection conditions may be adopted for the no-straight restriction and the no-left turn restriction with replacing B1 by B2 or B3 and setting allowable routes corresponding to B4 and B5.

Concrete examples are given below:

<<No-Straight Restriction>>

$B2=0;$ (condition 1)

$B2+B4A$ and $B5A>0;$ and (condition 2)

$B1+B2+B3.N.$ (condition 3)

In the condition 2, B4A indicates the route of turning left and entering the link Lb3 from the link Lb2, and B5A indicates the route of turning right and entering the link Lb3 from the link Lb4.

<<No-Left Turn Restriction>>

$B3=0;$ (condition 1)

$B3+B4B$ and $B5B>0;$ and (condition 2)

$B1+B2+B3.N.$ (condition 3)

In the condition 2, B4B indicates the route of turning right and entering the link Lb2 from the link Lb3, and B5B indicates the route of going straight and entering the link Lb2 from the link Lb4. The meaning of N used for the detection conditions is described. FIG. 3C is a graph showing variations in coverage rate and accuracy rate plotted against the number of detections. Curves C1 and C2 respectively show the coverage rate and the accuracy rate with respect to the one-way traffic restriction. Curves C3 and C4 respectively show the coverage rate and the accuracy rate with respect to the direction regulation. The accuracy rate is a ratio of the number of accurate detections of regulation information to the total number of analysis objects of the probe information. When the accurate detection result is obtained at only one place out of 100 places as the analysis objects, the accuracy rate is 1%. The number of detections means the number of probe information used for analysis. The analytical approach of the embodiment is statistical analysis of probe information, so that the accuracy rate increases with an increase in number of detections. The accuracy rate of the direction regulation (curve C4) is lower than the accuracy rate of the one-way traffic restriction (curve C2), because of the reason described later.

By referring to the graph of the accuracy rate, setting a target value of the accuracy rate determines the corresponding number of detections N. For example, when the target value of the accuracy rate is set to 90%, the number of detections required to achieve this target value is between 5 and 10. The number of detections determined in this manner may be used as N in FIGS. 3A and 3B. The value of N as the criterion of detection of regulation information is hereinafter referred to as the reference value or the number N.

The number N determined as 5 to 10 on the curve C4 in FIG. 3C is only illustrative, and the value of the number N may be changed according to the conditions of obtaining probe information and the target detection area of traffic regulation. When the traffic regulation is detected, it is preferable to specify a graph equivalent to FIG. 3C together with the conditions of obtaining probe information and determine the number N as the target value.

In the illustrated example, a value of greater than 100 is to be set to the number N, in order to achieve the accuracy rate of 90% as the target value with respect to the direction regulation (curve C4).

The lower accuracy rate of the direction regulation (curve C4 than the accuracy rate of the one-way traffic restriction (curve C2) in FIG. 3C may be attributed to the following reason. The method of detecting the traffic regulation described in FIGS. 3A and 3B is merely the statistical approach, so that the absence of probe information on the route of the arrow A1 or the route of the arrow B1 does not necessarily indicate the presence of traffic regulation. When there is any of various avoidance factors that keeps the driver from passing through the road, for example, the narrow road, the probe information may indicate zero probe car even without any traffic regulation.

The result of observation of various intersections and roads indicates that the direction regulation generally has a greater number of avoidance factors than the one-way traffic restriction. A wider variety of factors, for example, the corner at which the vehicle turns right has the acute angle or the link Lb4 entering after a right turn is the narrow road, may serve as the avoidance factors for the direction regulation, compared with those for the one-way traffic restriction. This means, on the contrary, that the accuracy rate equivalent to that of the curve C2 may be obtained with respect to the intersection without any avoidance factors.

The following described the coverage rate. The coverage rate is a ratio of the number of accurate detections as the analysis result of probe information to all the roads with the one-way traffic restriction. For example, when the analysis of probe information gives the accurate detection result at only one place out of 100 places with the one-way traffic restriction, the coverage rate is 1%. Increasing the number of detections increases the number of probe information required for detection of traffic regulation on one specific intersection or road. This may accordingly increase the number of intersections with undetectable result of traffic regulation, due to the insufficient number of detections. The coverage rate (curves C1 and C3) accordingly decreases with an increase in number of detections. There is no significant difference in tendency of the coverage rate between the one-way traffic restriction (curve C1) and the direction regulation (curve C3).

D1. Traffic Regulation Detection Process

The following describes a traffic regulation detection process. The traffic regulation detection process corresponds to the functions of the traffic regulation determination unit 211 and the avoidance factor determination unit 212 of the analysis terminal 100 and is executed by the CPU of the analysis terminal 100 as the hardware.

Figure 4:
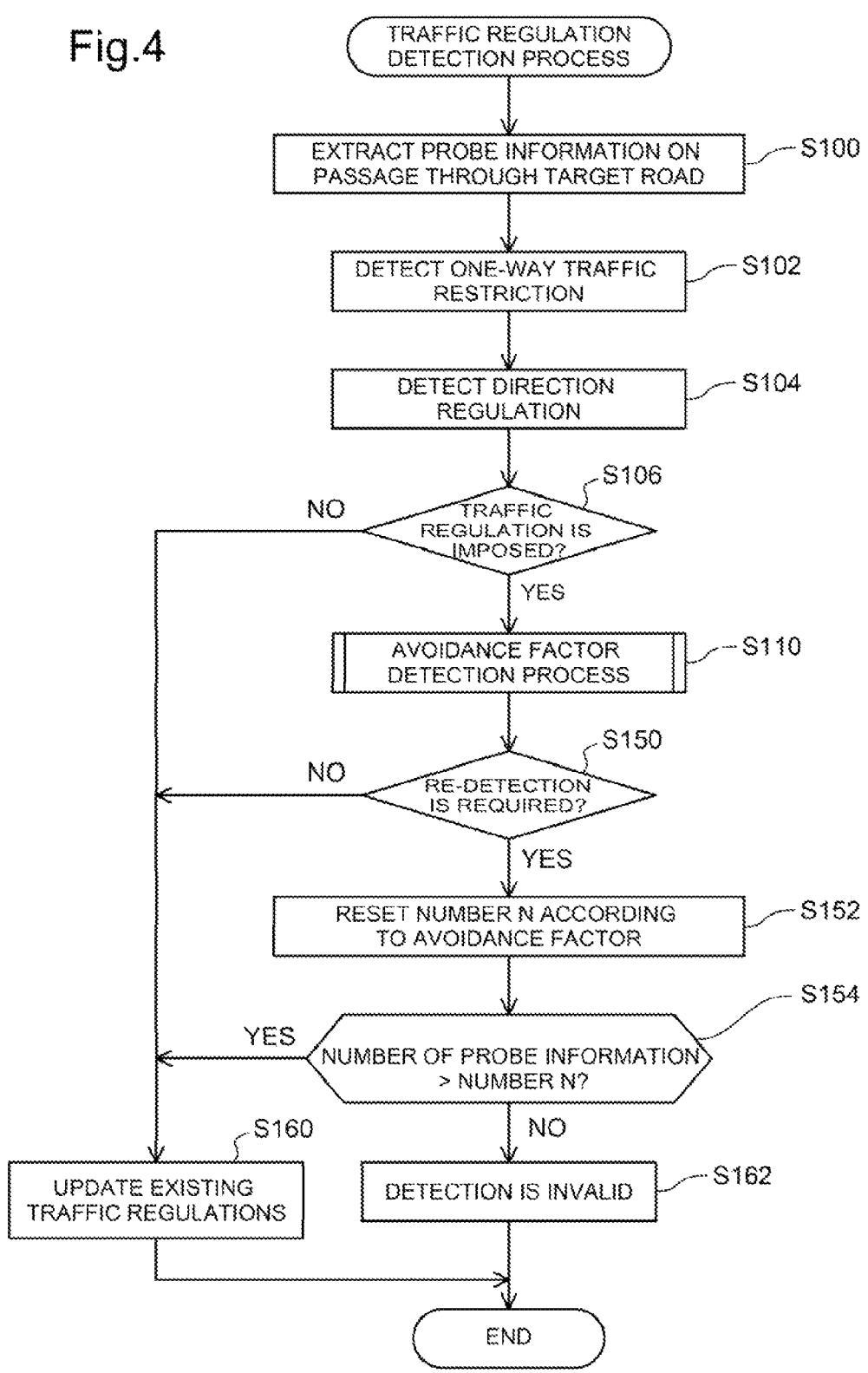
FIG. 4 is a flowchart showing a traffic regulation detection process.

FIG. 4 is a flowchart showing a traffic regulation detection process. This process selects a target road as the detection object and detects the traffic regulation, i.e., the one-way traffic restriction or the direction regulation, imposed on the target road. With regard to the direction regulation, a road, from which the vehicle enters an intersection as the detection object is specified as the target road. The CPU first extracts probe information on passage through the target road from the probe information storing unit 240 (step S100) and sequentially detects the presence or the absence of the one-way traffic restriction (step S102) and the presence or the absence of the direction regulation (step S104), based on the extracted probe information. More specifically, the CPU determines whether the detection conditions shown in FIG.

3A or FIG. 3B are satisfied and detects the presence of the corresponding restriction on satisfaction of the conditions. Detection of the direction regulation (step S104) detects the presence or the absence of traffic regulations on all the routes passing through the intersection, for example, no-right turn restriction, no-straight restriction and no-left turn restriction.

When it is determined that neither of the one-way traffic restriction and the direction regulation is imposed on the target road (step S106), the CPU updates the existing traffic regulations (step S160) and terminates this process. When any traffic regulation has been stored as the attribute information of the target road in the road network data, the CPU determines that the stored regulation information is wrong and deletes the regulation information. Instead of updating the traffic regulations, the CPU may inform the operator of the fact that the detection result of the traffic regulation is different from the regulation information stored in the road network data.

When it is determined that either the one-way traffic restriction or the direction regulation is imposed on the target road (step S106), on the other hand, the CPU performs an avoidance factor detection process (step S110). In the presence of any avoidance factor, there is a possibility that the accuracy rate decreases as shown by the curve C4 in FIG. 3C. In this case, the detection result of the traffic regulation (steps S102 and S104) may be incorrect. The avoidance factor detection process is accordingly performed to detect the presence or the absence of any avoidance factor and thereby determines the adequacy of the detection result of the traffic regulation (steps S102 and S104). The details of the avoidance factor detection process will be described later.

When the result of the avoidance factor detection process indicates no requirement for re-detection, i.e., the absence of any avoidance factor and it is determined that the detection result of steps S102 and S104 is adequate (step S150), the CPU updates the existing traffic regulations (step S160) and terminates this process. Instead of updating the traffic regulations, the CPU may inform the operator of the detection result or the mismatching with information on the traffic regulation stored in the road network data.

When the result of the avoidance factor detection process indicates the presence of any avoidance factor and requirement for re-detection of the traffic regulation (step S150), the CPU resets the number N according to the avoidance factor (step S152).

The reset number N may be determined by the following method. The accuracy rate in the presence of any avoidance factor is lower than the accuracy rate in the absence of any avoidance factor (curve C2) shown in FIG. 3C, but a curve representing the relationship between the accuracy rate and the number of detections is still obtainable even in the presence of any avoidance factor. The number N achieving the target accuracy rate (for example, 90%) may be determined according to this curve. It is, however, not necessary to calculate the number N based on the relationship between the accuracy rate and the number of detections at step S152. The reset number N may alternatively be determined by the procedure described above.

The target value of the accuracy rate in the case of resetting the number N may not be necessarily identical with the target value in the absence of any avoidance factor.

After resetting the number N, the CPU determines whether the number of probe information extracted at step S100 is greater than the reset number N (step S154). When the number of probe information is greater than the number N, it is determined that the detection result of steps S102 and S104 has the sufficient accuracy rate even in the presence of any avoidance factor. The CPU accordingly updates the existing traffic regulations with the detection result (step S160) and terminates this process.

When the number of probe information is not greater than the number N, on the other hand, it is determined that the detection result of steps S102 and S104 has insufficient accuracy rate. The CPU accordingly determines the detection result as invalid (step S162) and terminates this process. The process of FIG. 4 reads all the probe information from the probe information storing unit 240 at step S100. There is accordingly no additional probe information available for the detection, so that the reset number N is not completed. In this case, the traffic regulation detection process is performed again after waiting for a time period when more probe information is stored.

D2. Traffic Regulation Detection Process (Modification)

The traffic regulation detection process may be modified in various ways. FIG. 4 shows the process example of reading all the probe information stored in the probe information storing unit 240 at the first step (step S100 in FIG. 4). When the number N is an extremely large value, it takes time to read all the probe information. In such cases, the process may read only a required number of probe information for detection. This process example is described below as one modification.

FIG. 5 is a flowchart showing another traffic regulation detection process according to one modification. The CPU first initially sets the number N (step S100A). This initial setting is on the assumption of the absence of any avoidance factor. The number N may be determined according to the target accuracy rate as shown by the curve C2 in FIG. 3C. The number N may be a common value or may be different values set as the criterion of detection of the one-way traffic restriction and the criterion of detection of the direction regulation.

The CPU then extracts the initially set number N of probe information on passage through the target road (step S100B). Unlike the process of FIG. 4, the CPU reads only the required number of probe information for detection.

The CPU subsequently detects the presence or the absence of the one-way traffic restriction and the presence or the absence of the direction regulation, based on the extracted probe information (steps S102 and S104). When the detection result indicates the absence of the traffic regulation (step S106), the CPU updates the existing traffic regulations and terminates this process. When the detection result indicates neither of the traffic regulations, it is obvious that using the greater number of probe information gives the same result.

When the detection result indicates the presence of the traffic regulation (step S106) and it is determined that the number N has already been reset (step S107), the CPU similarly updates the existing traffic regulations (step S160) and terminates this process. As described below, the traffic regulation detection process of the modification repeats the detection of the traffic regulation (steps S102 and S104) with changing the setting of the number N according to the avoidance factor. When the number N has already been rest (step S107), this means that redetection of the traffic regulation according to the avoidance factor has been completed. The process can thus be terminated here.

When the number N has not yet been reset (step S107), the CPU performs the avoidance factor detection process (step S110). When the result of the avoidance factor detection process indicates the absence of any avoidance factor (step S151), there is no need to reset the number N. Since the detection result at steps S102 and S104 is adequate, the CPU updates the existing traffic regulations with the detection result (step S160) and terminates this process.

When the result of the avoidance factor detection process indicates the presence of any avoidance factor (step S151), the CPU resets the number N according to the avoidance factor (step S152). The number N is reset by the same method as that described above with respect to step S152 of FIG. 4.

The CPU repeats the processing of and after the extraction of the probe information (step S100B) with the newly set number N. The number N set in the presence of any avoidance factor is larger than the number N set in the absence of any avoidance factor. At step S100B, the CPU additionally extracts the probe information to compensate for the deficiency. When extraction of all the probe information still does not complete the reset number N, the process is terminated with an error message.

When the extracted probe information completes the reset number N, on the other hand, the CPU detects the one-way traffic restriction and the direction regulation based on the extracted probe information (steps S102 and S104). Since the number N has already been reset, whether the detection result indicates the presence or the absence of the traffic regulation (steps S106 and S107), the CPU updates the existing traffic regulations with the detection result (step S160) and terminates this process.

E. Detection of Avoidance Factor

The following describes the avoidance factor detection process at step S110 in the traffic regulation detection process (FIG. 4 or FIG. 5). The avoidance factor means the cause why the driver keeps from passing through a target intersection or a target road along a target route. The following describes examples of the avoidance factor and subsequently an algorithm for detecting the presence or the absence of any avoidance factor.

Figure 6D:
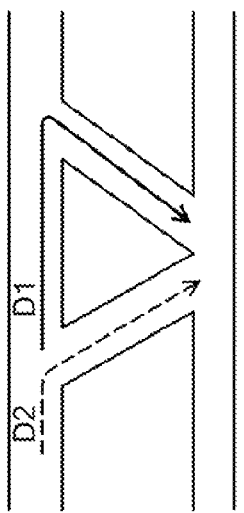
FIGS. 6A through 6F are diagrams illustrating avoidance factors.
Figure 6E:
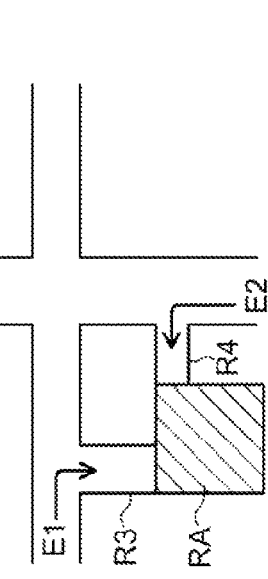
Figure 6F:
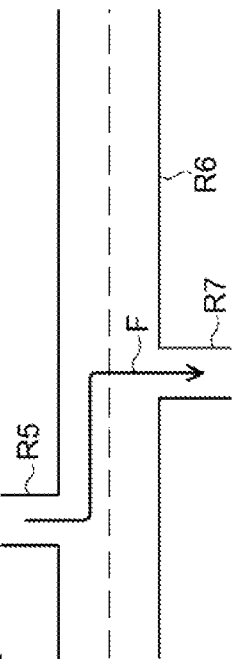
Figure 6A:
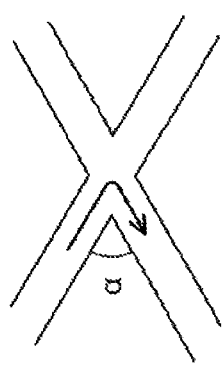

FIGS. 6A through 6F are diagrams illustrating avoidance factors. FIG. 6A illustrates an intersection of an acute angle. The driver may feel some difficulty in passing through this intersection by the illustrated arrow. This intersection accordingly has the avoidance factor for the route of this direction.

Figure 6B:
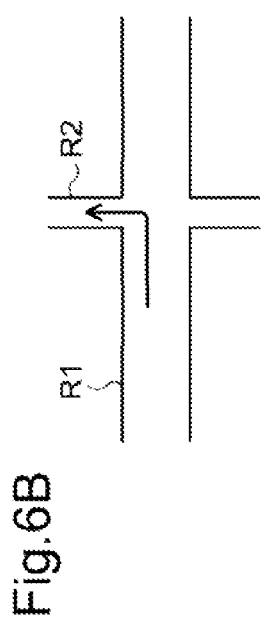

FIG. 6B illustrates an example that different levels of roads are connected. A road R1 is a wide, main road, such as national road or prefectural road, and a road R2 is a narrow street. Entering the narrow street from the main road is generally limited to the case when a destination is located ahead of the narrow street. The number of drivers entering the road R2 from the road R1 is thus significantly less than the number of drivers going straight on the road R1. This may accordingly work as one of the avoidance factors. The levels of the respective roads may be determined, based on the road network data. When the road network data is divided into the group of main roads that are used for route search and the group of roads that are converted into nodes and links but are not used for route search, the levels of the respective roads may be determined, based on such division. Alternatively the levels of the respective roads may be determined according to the types of the roads.

The illustrated examples of FIGS. 6A and 6B show the avoidance factors detectable based on the geometric configuration of the intersection and the links connecting with the intersection. Such avoidance factors detectable based on only the neighborhood of the intersections are hereinafter called local avoidance factors.

Figure 6C:
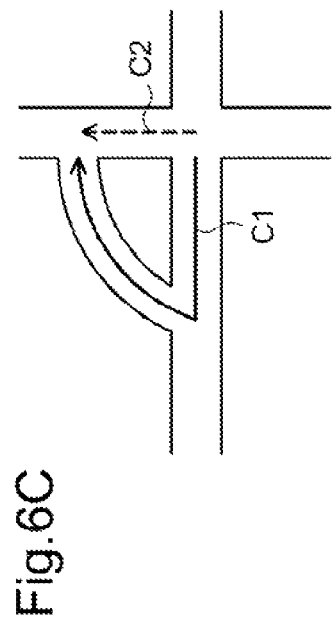

FIG. 6C illustrates a detour route. As illustrated, the route of an arrow C1 is a detour route, compared with the route of an arrow C2. For the drivers who can select the route of the arrow C2, there is no merit to select the route of the arrow C1. There are accordingly a significantly smaller number of drivers selecting the route of the arrow C1 over the route of the arrow C2. From this viewpoint, the route of the arrow C1 has the avoidance factor.

FIG. 6D also illustrates a detour route. As illustrated, the route of an arrow D1 is a detour route, compared with the route of an arrow D2. There are accordingly a significantly smaller number of drivers selecting the route of the arrow D1 over the route of the arrow D2. From this viewpoint, the route of the arrow D1 has the avoidance factor.

FIG. 6E illustrates an example of the route used by only the limited drivers. A hatched area RA represents a specific district, such as residential area or shopping area, and only the drivers whose destinations are located in the area RA approach the area RA. There is an available route of passing through the area RA by roads R4 and R3. Only the limited drivers, however, enter the area RA as shown by arrows E1 and E2, and there are a significantly smaller number of drivers passing through the roads R3 and R4. The roads R3 and R4 connecting with the area RA of the specific district accordingly have the avoidance factor.

FIG. 6F illustrates an example of the route having difficulty in passage. As shown by an arrow F, the driver who goes from a road R5 to a road R7 is required to take a route crossing a road R6 in a crank shape. Especially when the road R6 is a wide street having a plurality of lanes, this route cannot ensure safe passage and thereby tends to be avoided. From this viewpoint, the route of the arrow F1 has the avoidance factor.

Unlike the local avoidance factors (FIGS. 6A and 6B), the avoidance factors illustrated in FIGS. 6C to 6F are detectable based on the connecting state of the roads in a predetermined area including the target intersection and the target road. Such avoidance factors are hereinafter called wide-area avoidance factors.

Figure 7:
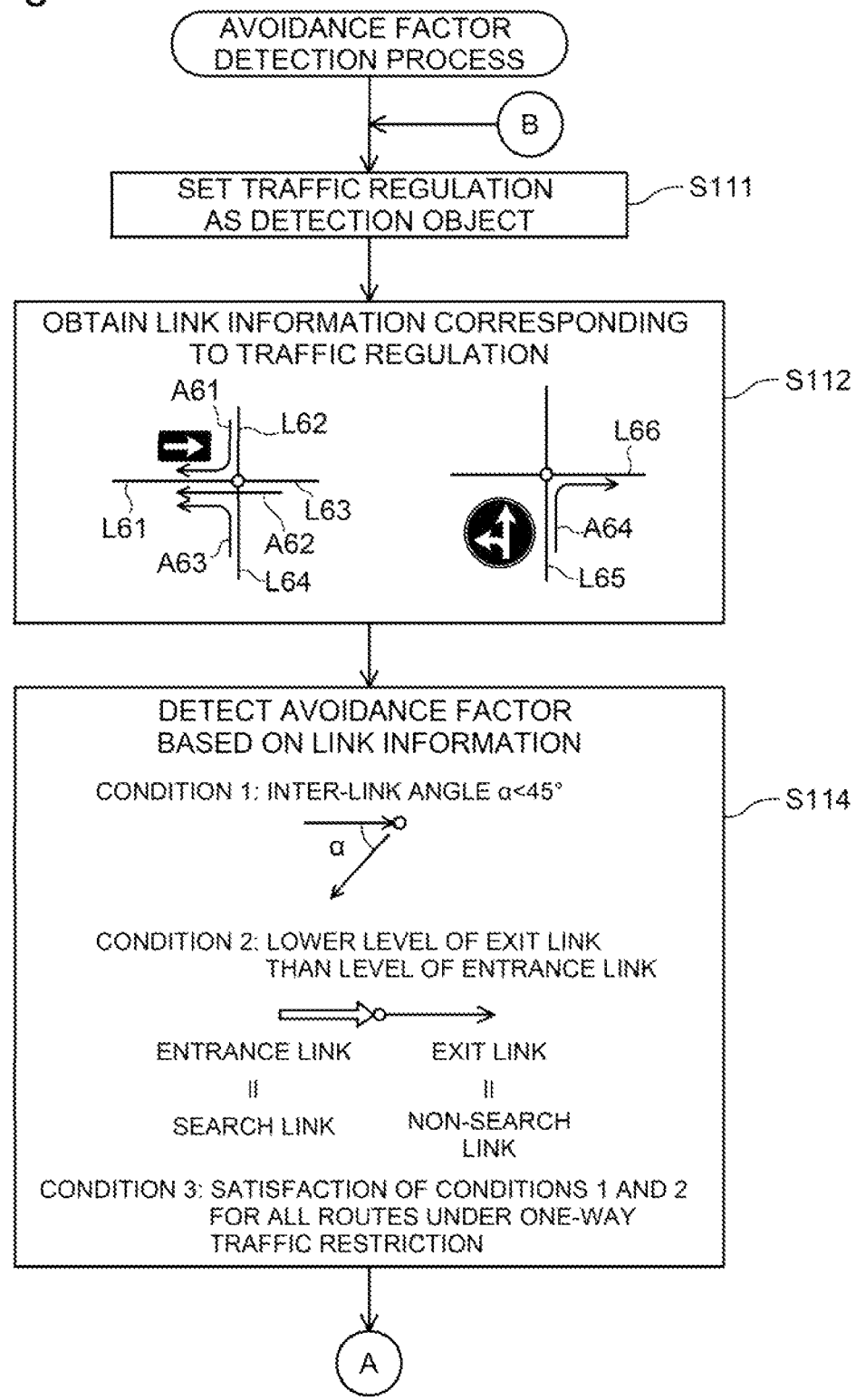
FIG. 7 is a flowchart (1) showing an avoidance factor detection process.
Figure 8:
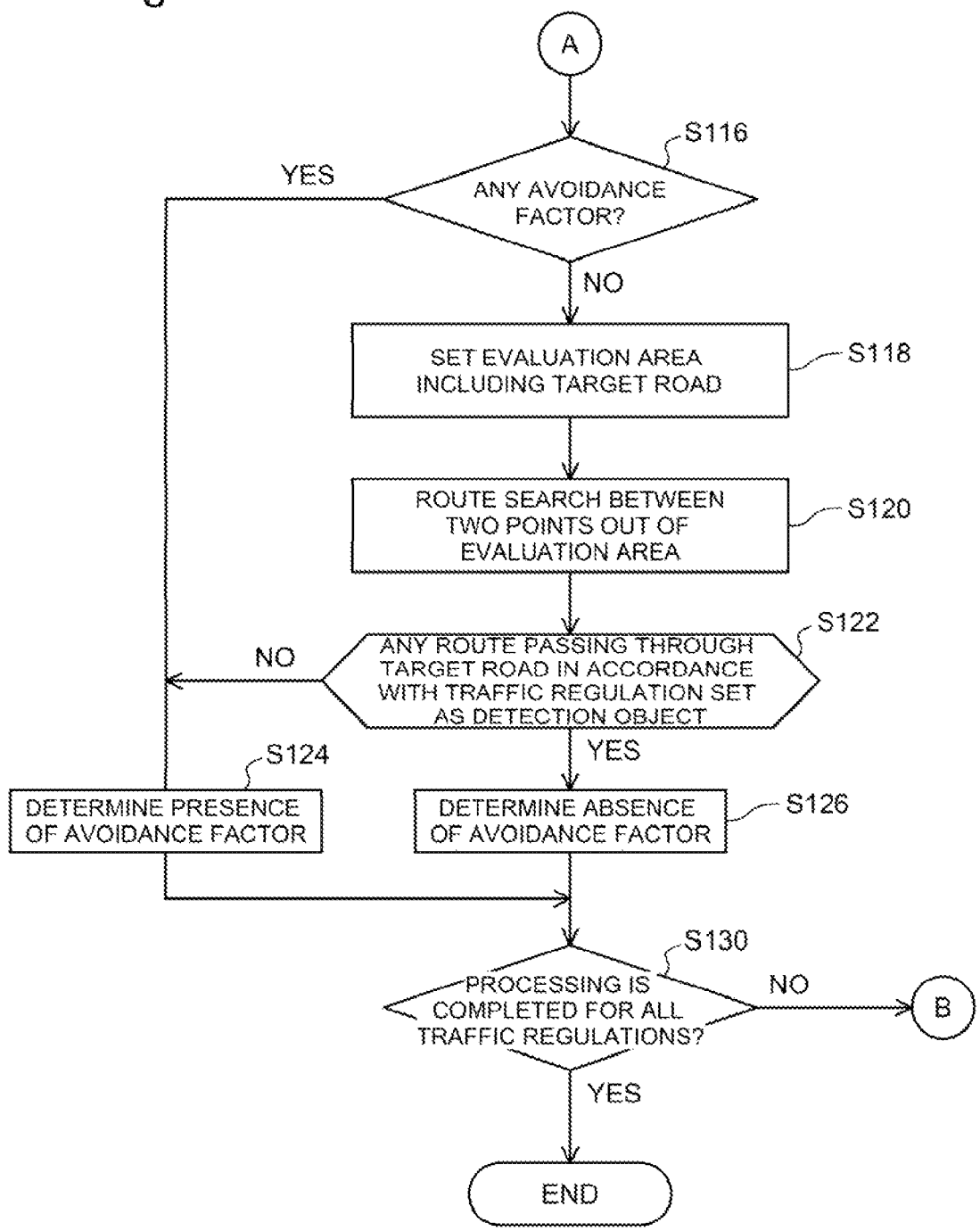
FIG. 8 is a flowchart (2) showing the avoidance factor detection process.

FIGS. 7 and 8 are flowcharts showing the avoidance factor detection process. This process corresponds to the functions of the avoidance factor determination unit 212.

Detection of the avoidance factor is performed with respect to each traffic regulation as the detection object. The CPU first sets a traffic regulation as the detection object (step S111) and obtains link information corresponding to the set traffic regulation (step S112). The link information is information used for detection of the local avoidance factor, for example, the inter-link angle and information regarding the levels of roads, such as the road type and the coverage of route search.

An example of link information is illustrated. When the one-way traffic restriction from a link L61 to a link L63 is imposed as shown in the left-side drawing, the CPU obtains link information on routes against this restriction (arrow A61 to A63). More specifically, the CPU obtains link information on the routes entering the link L61 from links L62, L63 and L64. When the no-right turn restriction is imposed as shown in the right-side drawing, the CPU obtains link information on route of an arrow A64, i.e., a route from a link L65 to a link L66, against this restriction. Similarly the CPU obtains corresponding link information in the case of the direction regulation, such as no-straight restriction or no-left turn restriction.

The CPU detects the avoidance factor based on the obtained link information (step S114). In this flow, the local avoidance factor is set as the detection object. The presence of a local avoidance factor is detected, when one of the following conditions 1 to 3 is satisfied: (condition 1) inter-link angle. <45 degrees: This condition is used to determine that the route passing through the intersection at the acute angle (see FIG. 6A) has the avoidance factor. A different value other than 45 degrees may be used as the criterion of detection; (condition 2) lower level of exit link than entrance link: This condition is used to determine that the route entering the road of the lower level (see FIG. 6B) has the avoidance factor. As illustrated, when the entrance link is a search link (link used for route search) and the exit link is a non-search link (link not used for route search), this condition is satisfied. When the entrance link has the road type of national road or prefectural road and the exit link has the road type of narrow street, it may be determined that this condition is satisfied; and (condition 3) satisfaction of conditions 1 and 2 for all routes under one-way traffic restriction:

Under the one-way traffic restriction, the absence of a probe car entering the link L61 from the right side is determinable only when all the routes of the arrows A61 to A63 shown at step S112 have no avoidance factor. When it is determined that there is any avoidance factor (step S116), the CPU outputs the detection result (step S124).

When it is determined that there is no avoidance factor (step S116), on the other hand, the processing flow shifts to the detection of the wide-area avoidance factor. The method of detecting the wide-area avoidance factor is described with reference to FIG. 9.

Figure 9:
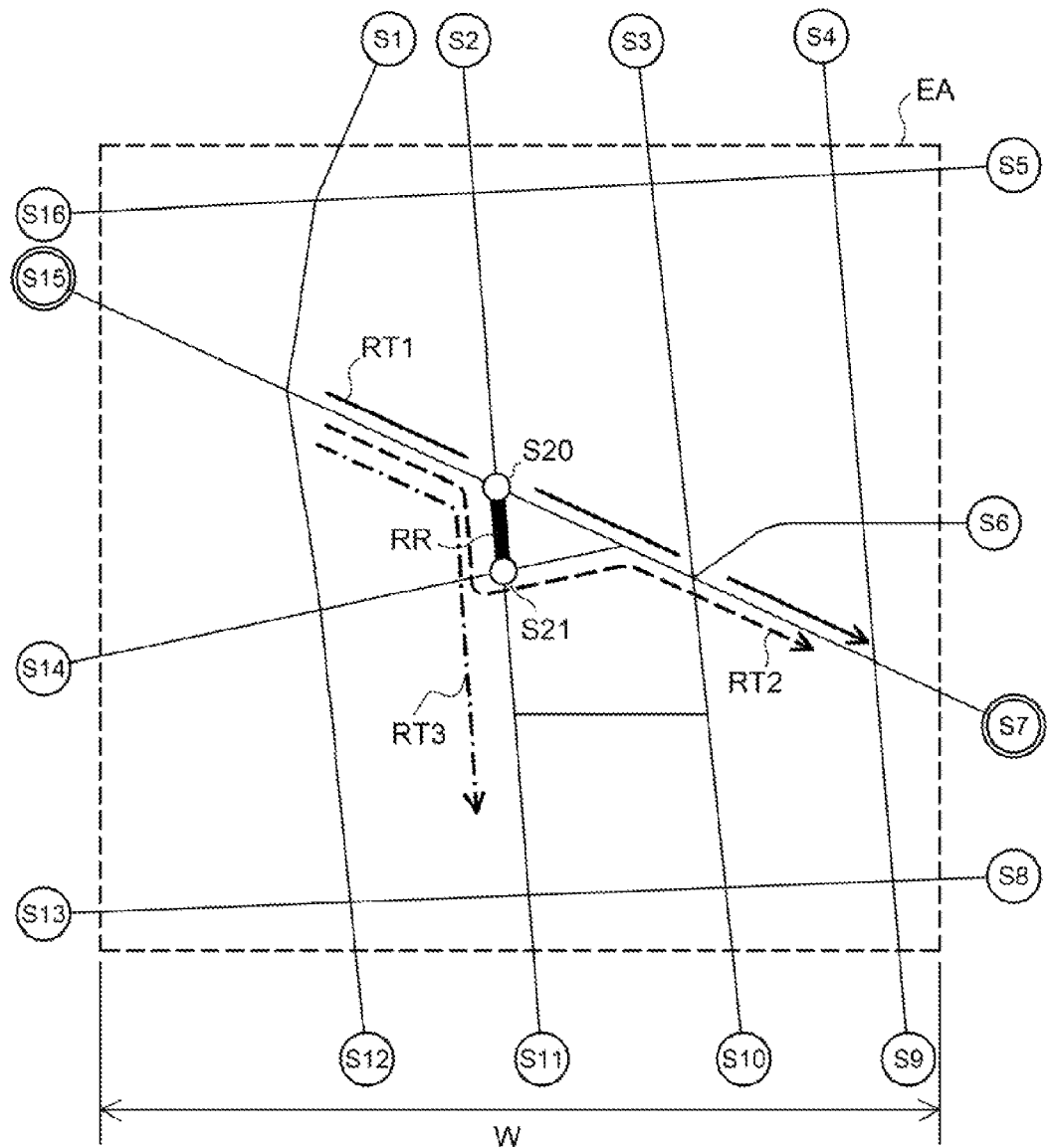
FIG. 9 is a diagram illustrating an avoidance factor detection method.

FIG. 9 is a diagram illustrating an avoidance factor detection method. The avoidance factor is detected with respect to the traffic regulation imposed on the route passing through a road RR. This method detects the avoidance factor by utilizing the route search.

The method first sets an evaluation area EA in a square shape of W on each side including the road RR as the detection object. The width of the evaluation area EA may be set arbitrarily. The wider evaluation area EA allows detection of the wide-area avoidance factor with relatively high accuracy but expands the range of route search to disadvantageously have the increased processing load. The narrower evaluation area EA, on the other hand, excludes detour routes as shown in FIGS. 6C and 6D from the evaluation area EA and lowers the accuracy of detection of the avoidance factor. The width of the evaluation area EA may thus be set by taking into account both the processing load and the accuracy of detection. The shape of the detection area EA is not limited to the square shape but may be any other suitable shape. The width of the evaluation area EA may be changed according to the frequency of intersections, for example, in the city and in the countryside.

The method subsequently extracts nodes in the neighborhood of the set evaluation area EA. In the illustrated example, sixteen nodes S1 to S16 are extracted. The method performs route search with setting these nodes as the start point and the terminal point and extracts routes passing through the road RR or either of nodes S20 and S21 on both ends of the road RR. In the illustrated example, a route RT1 passing through the node S20 is found as the result of route search with setting the node S15 as the start point and the node S7 as the terminal point. A route RT2 passing through the road RR is, however, not found. This indicates that the route passing through the road RR is a detour route when the driver goes from the node S15 to the node S7.

The route search between various points determines the frequency of use of the road RR. The route RT2 is not selected between the nodes S15 and S7. Similarly, the route RT1 is obviously selected as the result of route search with setting the node S15 as the start point and any of the nodes S8, S9 and S10 as the terminal point.

In this illustrated example, a route RT3 passing through the road RR is selected as the result of route search with setting the node S15 as the start point and the node S11 as the terminal point. Among the routes starting from the node S15 and passing through the node S20, the route passing through the road RR is somehow used but has low frequency of use. This route passing through the road RR may not be used at all under some road conditions in the neighborhood of the road RR. For example, when the no-right turn restriction is imposed on a route RT2 passing through the node S20, the absence of the route passing through the road RR or the low frequency of use of this route suggests the presence of the wide-area avoidance factor.

According to this embodiment, the method performs route search with various combinations of nodes with respect to the evaluation area EA including a target road or a target intersection as the detection object. The method detects the presence or the absence of a wide-area avoidance factor, based on the number of routes passing through the target road or the target intersection or the ratio of such routes. Embodiment 1 determines the presence of an avoidance factor when there is no route passing through the target road or the target intersection. Embodiment 2 determines the presence or the absence of an avoidance factor based on the ratio of such routes. The ratio of routes may be the ratio of routes going in the direction in accordance with the target traffic regulation (for example, no-right turn restriction) to all routes passing through the end point of the target road RR. Alternatively the ratio of routes may be the ratio of routes to all routes obtained as the result of route search.

Referring back to FIG. 8, the process of detecting the wide-area avoidance factor is described. For detection of the wide-area avoidance factor, the CPU first sets an evaluation area including a target road (area EA in FIG. 9) (step S118) and performs route search between two points out of the evaluation area (step S120).

When the result of route search indicates no route passing through the target road in accordance with the traffic regulation set as the detection object (step S122), the CPU determines the presence of a wide-area avoidance factor (step S124). The condition of step S122 may be replaced with the condition of "when the number of routes found as the result of route search is equal to or less than a specified number".

When the result of route search indicates any route passing through the target road in accordance with the traffic regulation (step S122), on the other hand, the CPU determines the absence of a wide-area avoidance factor (step S126).

The CPU repeats the above series of processing until the processing is completed for all the traffic regulations (step S130). The process accordingly detects the presence or the absence of a local avoidance factor (steps S112 and S114) and the presence or the absence of a wide-area avoidance factor (steps S118 to S122). The result of detection is used in the traffic regulation detection process (FIG. 4 or FIG. 5) described above.

Embodiment 1 described above determines the adequacy of the number N according to the presence or the absence of an avoidance factor and detects the presence or the absence of a traffic regulation. When there is any avoidance factor, the number N is increased to improve the accuracy of detection of the traffic regulation. The process does not detect the traffic regulation using the same number N for all the target intersections and the target roads but detects the traffic regulation with increasing the number N as needed basis according to the presence or the absence of the avoidance factor. This process reduces the required volume of probe information as the whole, while improving the detection accuracy. The less number of detections increases the coverage rate as illustrated in FIG. 3C, so that this process also increases the coverage rate.

Embodiment 2

The following describes a regulation information analysis system according to Embodiment 2. The system configuration and the pre-analysis process of Embodiment 2 are identical with those of Embodiment 1. The difference is that Embodiment 2 deals with the avoidance factor in the form of an index, while Embodiment 1 performs binary detection of whether the avoidance factor is present or absent.

Figure 10A:
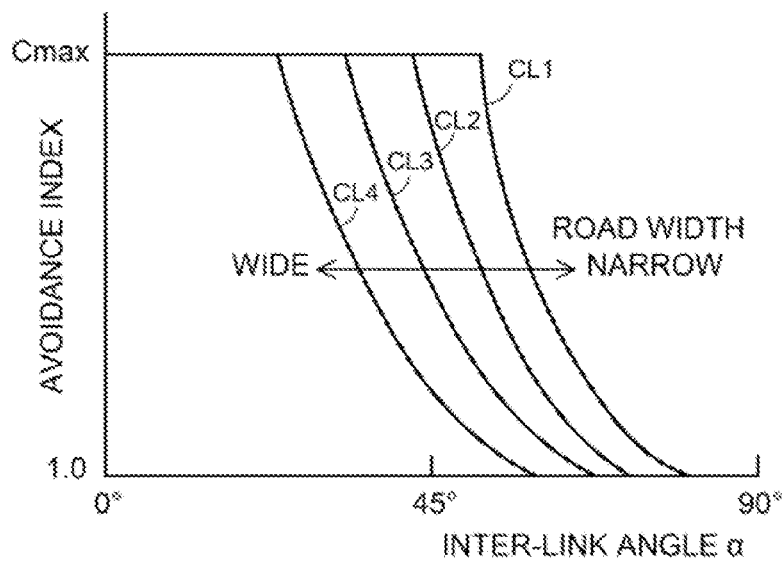
FIGS. 10A through 10C are diagrams showing avoidance indexes.
Figure 10C:
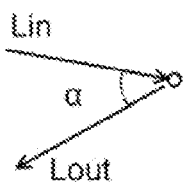
Figure 10B:
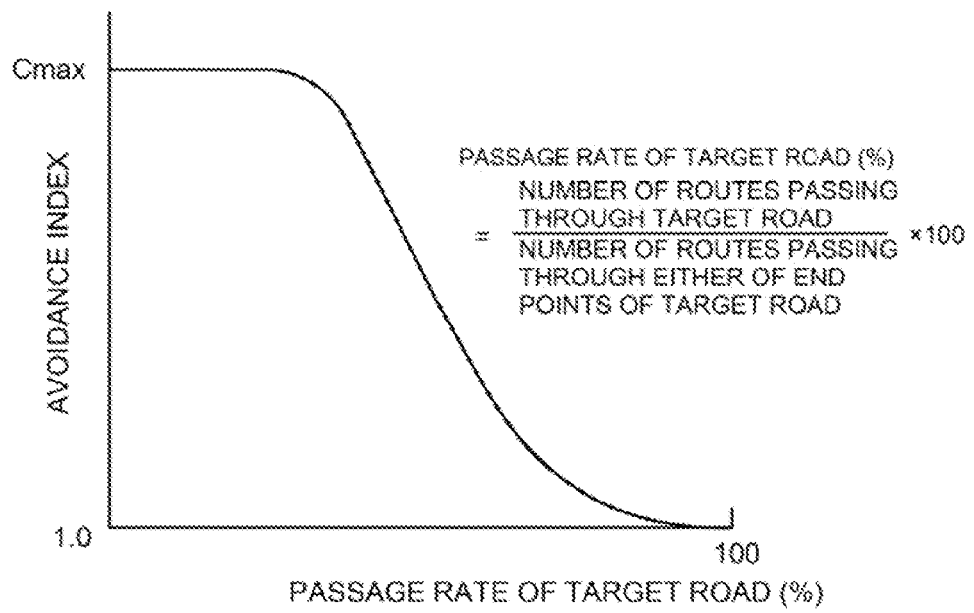

FIGS. 10A through 10C are diagrams showing avoidance indexes. FIG. 10A shows an example of index with respect to the angle α of an intersection as one of the local avoidance factors. The angle α of an intersection is the inter-link angle between an entrance link Lin and an exit link Lout as shown in the right-side box as shown in FIG. 10C.

The process of Embodiment 2 provides a graph of varying the avoidance index between 1.0 and Cmax with the inter-link angle and sets the avoidance index with reference to this graph. The higher avoidance index means the higher possibility that the driver avoids. The value of Cmax is set according to the number N for achieving the target accuracy rate in the presence of an avoidance factor. When the number N in the presence of an avoidance factor is to be doubled the number N in the absence of an avoidance factor, Cmax is set equal to 2.0.

The easiness of passage of the intersection is affected by the road width. A plurality of avoidance index curves are accordingly provided with respect to the road width as the parameter. The narrower road width causes the driver to have more difficulty in passing through an intersection of even the larger acute angle. The avoidance index accordingly reaches Cmax at the inter-link angle of larger than 45 degrees as shown by a curve CL1. The wider road width causes the driver to have less difficulty in passing through an intersection of even the less acute angle. The inter-link angle at which the avoidance index reaches Cmax accordingly decreases as shown by curves CL2 to CL4. This is only illustrative, and the avoidance index may be set independently of the road width. The avoidance index may also be set according to the level of the road. For example, the avoidance index may be set with the difference between the road widths of the entrance link and the exit link as abscissa.

FIG. 10B shows an example of avoidance index with respect to the wide-area avoidance factor. The process provides a graph of varying the avoidance index with the passage rate of the target road and sets the avoidance index with reference to this graph. The passage rate of the target road is the ratio of the number of routes passing through the target road to the number of routes passing through either of the end points of the target road as shown in the upper right box. In the illustrated example of FIG. 9, the passage rate of the target road is the ratio of the route RT3 passing through the target road RR to all the routes (e.g., route RT1) passing through the node S20 found as the result of route search.

The passage rate of the target road equal to 100% means that the target road is a main road frequency used as the route. This suggests the absence of an avoidance factor and thereby sets the avoidance index equal to 1.0. The passage rate of the target road equal to 0%, on the other hand, means that the target road is not used at all. This suggests the presence of an avoidance factor and thereby sets the avoidance index equal to Cmax. The avoidance index in the middle may be set along the illustrated curve. This index is, however, only illustrative, and the avoidance index may be set based on any of various analysis results.

The graphs of setting the avoidance indexes shown in FIGS. 10A and 10B may be actually provided in the form of tables and stored in the memory of the analysis terminal 200. Embodiment 2 sets the avoidance factor as the index and accordingly performs a traffic regulation detection process and an avoidance index setting process (in place of the avoidance factor detection process of Embodiment) different from those of Embodiment 1. The following describes these processes.

FIG. 11 is a flowchart showing a traffic regulation detection process according to Embodiment 2. This is performed in place of the traffic regulation detection process (FIG. 4 or FIG. 5) of Embodiment 1. The CPU first performs an avoidance index setting process (step S200). This process sets the avoidance index of a target road using the graphs of avoidance indexes shown in FIGS. 10A and 10B.

Figure 12:
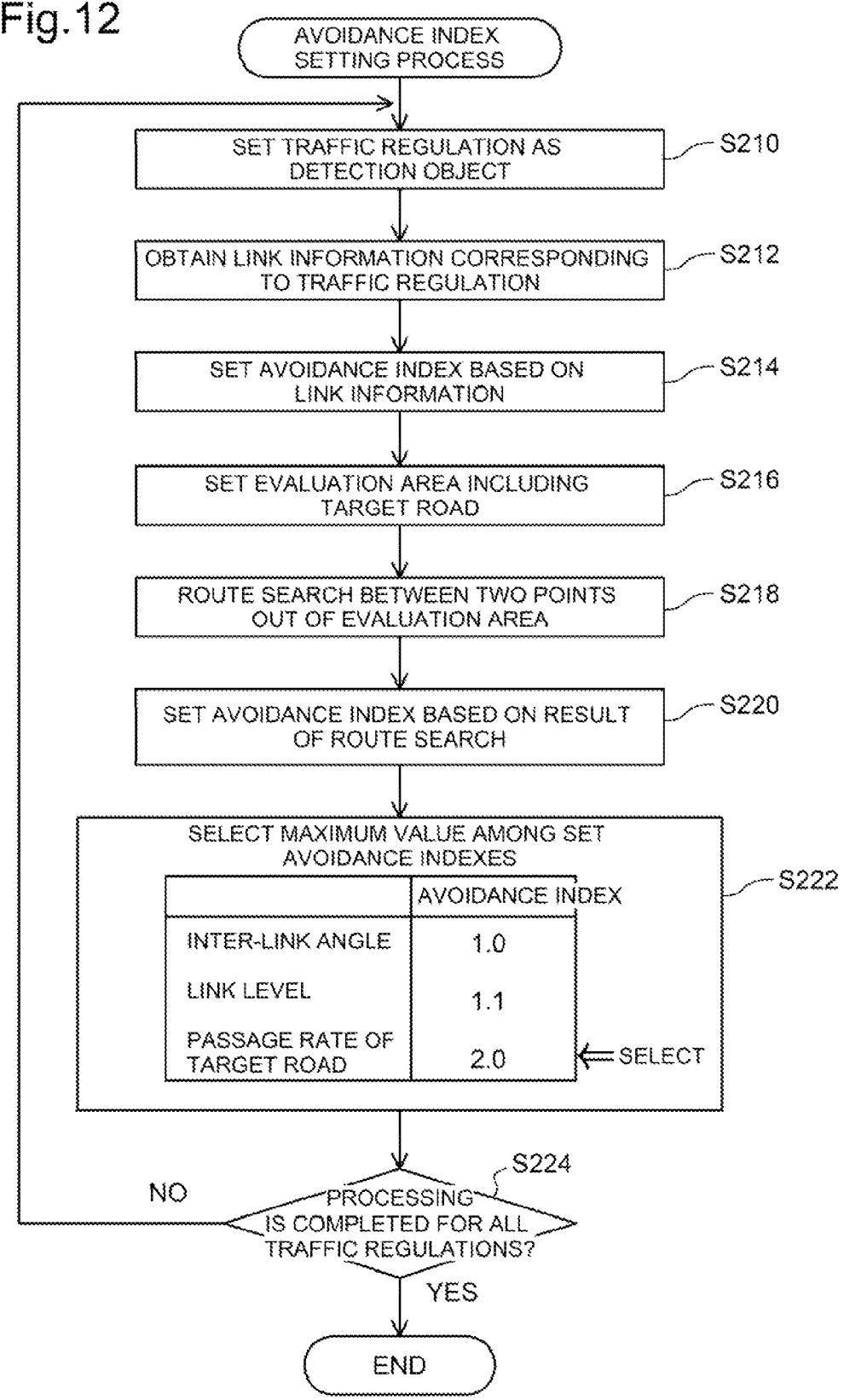
FIG. 12 is a flowchart showing an avoidance index setting process.

The details of the avoidance index setting process are described with reference to FIG. 12. The CPU first sets a traffic regulation as the detection object (step S210). The CPU subsequently obtains link information corresponding to the set traffic regulation (step S212). This process is identical with the process of step S112 of FIG. 7. The CPU then sets an avoidance index based on the obtained link information (step S214). For example, the CPU determines the inter-link angle and sets the avoidance index based on the graph shown in FIG. 10A. The avoidance index with respect to the road level may also be set by the similar method.

The CPU subsequently sets a wide-area avoidance index. More specifically, like the process of Embodiment 1, the CPU sets an evaluation area including a target road (step S216) and performs route search between two points out of the evaluation area (step S218). The CPU then calculates the passage rate of the target road as described above with reference to FIG. 10B and reads this graph to set the avoidance index (step S220).

The above series of processing sets the three avoidance indexes with respect to the inter-link angle, the link level and the passage rate of the target road. The CPU selects the maximum value among these three avoidance indexes as the avoidance index used for detection of the traffic regulation (step S222).

In the illustrated example, the avoidance indexes are respectively equal to 1.0, 1.1 and 2.0 with respect to the inter-link angle, the link level and the passage rate of the target road, so that the avoidance index of 2.0 with respect to the passage rate of the target road is selected. Using the maximum value enables the setting of the number N that ensures the sufficient accuracy rate for all the three avoidance factors.

The CPU repeats the above series of processing until the processing is completed for all the traffic regulations (step S24).

Referring back to FIG. 11, the traffic regulation detection process is described.

On completion of setting the avoidance index, the CPU sets the number N based on the avoidance index. The number N may be set by "base number N·avoidance index". The base number N is the number N in the absence of an avoidance factor. In the illustrated example of FIGS. 10A and 10B, since "1.0·avoidance index·Cmax", the number N is determined in the range of "base number N·number N·base number N·Cmax".

After setting the number N, the CPU extracts the number N of probe information on passage of the target road (step S252) and detects the traffic regulation with respect to the one-way traffic and the driving direction based on the extracted probe information (steps S254 and S256). The CPU then updates the existing traffic regulations with the detection results (step S258).

This process sets the number N by taking into account the status of the avoidance factors and accordingly does not require the adequacy determination after detection of the traffic regulation. This processing method may also be adopted for Embodiment 1. In this case, the avoidance factor detection process (FIGS. 7 and 8) may be performed instead of the avoidance index setting process (step S200) of FIG. 11, and the number N may be set based on the result of avoidance factor detection.

Embodiment 2 described above deals with the avoidance factor in the form of index. While Embodiment 1 changes the number N according to the presence or the absence of any avoidance factor, Embodiment 2 increases the number N to a required extent according to the status of the avoidance factors. The latter configuration controls an increase in number N and can thus increase the coverage rate with improving the accuracy rate.

The foregoing describes the embodiments of the invention. The regulation information analysis system may not have all the functions of either of the embodiments described above but may implement only part of the functions. The regulation information analysis system may have additional functions.

The invention is not limited to the above embodiments but various modifications and variations may be made to the embodiments without departing from the scope of the invention. For example, the hardware configuration of the embodiment may be replaced with the software configuration and vice versa.

INDUSTRIAL APPLICABILITY

The invention is applicable to upgrade map data or support upgrading of map data.

What is claimed is:

1. A regulation information analysis system that determines a traffic regulation which may be imposed on a target intersection or road by analyzing probe information sent from a plurality of vehicles and stored in a database, the regulation information analysis system comprising:
    a probe information storing unit configured to store the probe information including travelling paths of the plurality of vehicles;
    a road network data storing unit configured to store road network data including intersections and roads expressed by nodes and links, respectively;
    a traffic regulation determination unit configured to read, from the probe information storing unit, a first number of traveling paths of vehicles passing through the target intersection or road, and to statistically detect existence of a traffic regulation possibly imposed on the target intersection or road, based on a number or ratio of the traveling paths of vehicles passing through the target intersection or road via a target route among the first number of traveling paths; and
    an avoidance factor determination unit configured to read, from the road network data storing unit, the road network data for a specific area including the target intersection or road for which the existence of the traffic regulation is detected, and to determine if a configuration of the nodes and links associated with the target intersection or road satisfies a predetermined avoidance condition which provides an avoidance factor for the vehicles to avoid taking the target route through the target intersection or road,
    wherein the traffic regulation determination unit is further configured to read, from the probe information storing unit, a second number of traveling paths of vehicles passing through the target intersection or road if the avoidance factor is found by the avoidance factor determination unit for the target intersection or road, and to further determine if the traffic regulation exists on the target intersection or road with an enhanced statistical accuracy using the second number of traveling paths, the second number being greater than the first number.

2. The regulation information analysis system according to claim 1, wherein the traffic regulation determination unit determines adequacy of the second number under required accuracy, based on a result of the determination of the avoidance factor, so as to determine validity or invalidity of the determination that the traffic regulation exists.

3. The regulation information analysis system according to claim 1, wherein the traffic regulation determination unit sets the second number based on a result of the determination of the avoidance factor.

4. The regulation information analysis system according to claim 1, wherein the road network data further includes traffic regulation information regarding the traffic regulation which was previously known, and the traffic regulation determination unit updates the stored traffic regulation information based on a result of the determination of the existence of the traffic regulation.

5. The regulation information analysis system according claim 1, wherein the avoidance factor determination unit determines a status of the avoidance factor based on attributes of the target intersection or road or a geometric configuration of the target route.

6. The regulation information analysis system according to claim 1, further comprising:
    a route search unit configured to perform a route search between two points specified by the road network data,
    wherein the avoidance factor determination unit determines if there is the avoidance factor, based on a number or ratio of routes crossing the specified area by passing through the target intersection or road with respect to a total number of routes crossing the specific area found by the route search unit as a result of a plurality of route searches for multiple pairs of two points set outside of the specific area.

7. The regulation information analysis system according to claim 1, wherein the traffic regulation determination unit determines that the traffic regulation is imposed when the number or ratio of the traveling paths passing through the target route is equal to or less than a predetermined value.

8. The regulation information analysis system according to claim 2, wherein the traffic regulation determination unit sets the second number based on a result of the determination of the avoidance factor.

9. The regulation information analysis system according to claim 2, wherein the road network data further includes traffic regulation information regarding the traffic regulation which was previously known, and the traffic regulation determination unit updates the stored traffic regulation information based on a result of the determination of the existence of the traffic regulation.

10. The regulation information analysis system according to claim 3, wherein the road network data further includes traffic regulation information regarding the traffic regulation which was previously known, and the traffic regulation determination unit updates the stored traffic regulation information based on a result of the determination of the existence of the traffic regulation.

11. The regulation information analysis system according claim 2, wherein the avoidance factor determination unit determines a status of the avoidance factor based on attributes of the target intersection or road or a geometric configuration of the target route.

12. The regulation information analysis system according claim 3, wherein the avoidance factor determination unit determines a status of the avoidance factor based on attributes of the target intersection or road or a geometric configuration of the target route.

13. The regulation information analysis system according claim 4, wherein the avoidance factor determination unit determines a status of the avoidance factor based on attributes of the target intersection or road or a geometric configuration of the target route.

14. The regulation information analysis system according to claim 2, further comprising:
a route search unit configured to perform a route search between two points specified by the road network data, wherein the avoidance factor determination unit determines if there is the avoidance factor, based on a number or ratio of routes crossing the specified area by passing through the target intersection or road with respect to a total number of routes crossing the specific area found by the route search unit as a result of a plurality of route searches for multiple pairs of two points set outside of the specific area.

15. The regulation information analysis system according to claim 3, further comprising:
a route search unit configured to perform a route search between two points specified by the road network data, wherein the avoidance factor determination unit determines if there is the avoidance factor, based on a number or ratio of routes crossing the specified area by passing through the target intersection or road with respect to a total number of routes crossing the specific area found by the route search unit as a result of a plurality of route searches for multiple pairs of two points set outside of the specific area.

16. The regulation information analysis system according to claim 4, further comprising:
a route search unit configured to perform a route search between two points specified by the road network data, wherein the avoidance factor determination unit determines if there is the avoidance factor, based on a number or ratio of routes crossing the specified area by passing through the target intersection or road with respect to a total number of routes crossing the specific area found by the route search unit as a result of a plurality of route searches for multiple pairs of two points set outside of the specific area.

17. The regulation information analysis system according to claim 5, further comprising:
a route search unit configured to perform a route search between two points specified by the road network data, wherein the avoidance factor determination unit determines if there is the avoidance factor, based on a number or ratio of routes crossing the specified area by passing through the target intersection or road with respect to a total number of routes crossing the specific area found by the route search unit as a result of a plurality of route searches for multiple pairs of two points set outside of the specific area.

18. The regulation information analysis system according to claim 2, wherein the traffic regulation determination unit determines that the traffic regulation is imposed when the number or ratio of the traveling paths passing through the target route is equal to or less than a predetermined value.

19. The regulation information analysis system according to claim 3, wherein the traffic regulation determination unit determines that the traffic regulation is imposed when the number or ratio of the traveling paths passing through the target route is equal to or less than a predetermined value.

20. The regulation information analysis system according to claim 4, wherein the traffic regulation determination unit determines that the traffic regulation is imposed when the number or ratio of the traveling paths passing through the target route is equal to or less than a predetermined value.

* * * * *